United States Patent
German et al.

(10) Patent No.: US 9,553,942 B2
(45) Date of Patent: Jan. 24, 2017

(54) METHOD AND APPARATUS FOR A KEEP-ALIVE PUSH AGENT

(75) Inventors: Richard W. German, Carmel, IN (US); Tony E. Thompson, Leo, IN (US); Timothy M. Robbins, Avon, IN (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 249 days.

(21) Appl. No.: 13/540,131

(22) Filed: Jul. 2, 2012

(65) Prior Publication Data
US 2013/0007299 A1    Jan. 3, 2013

Related U.S. Application Data

(60) Provisional application No. 61/504,009, filed on Jul. 1, 2011.

(51) Int. Cl.
*G06F 15/16* (2006.01)
*H04L 29/08* (2006.01)

(52) U.S. Cl.
CPC .................................. *H04L 67/26* (2013.01)

(58) Field of Classification Search
CPC .......... H04L 67/26; H04L 67/00; H04L 67/02; H04L 67/28
USPC ......... 709/223, 217, 219, 235, 228; 370/235
See application file for complete search history.

(56) References Cited

U.S. PATENT DOCUMENTS

| | | | |
|---|---|---|---|
| 6,412,009 B1* | 6/2002 | Erickson | H04L 29/06 709/217 |
| 7,764,613 B2* | 7/2010 | Miyake et al. | 370/235 |
| 2001/0011301 A1* | 8/2001 | Sato et al. | 709/219 |
| 2002/0026495 A1* | 2/2002 | Arteaga | 709/217 |
| 2003/0236907 A1* | 12/2003 | Stewart | H04L 29/06 709/231 |
| 2006/0075114 A1* | 4/2006 | Panasyuk et al. | 709/227 |
| 2006/0149845 A1* | 7/2006 | Malin et al. | 709/228 |
| 2006/0182141 A1 | 8/2006 | Duggirala et al. | |
| 2008/0098101 A1* | 4/2008 | Black et al. | 709/223 |
| 2008/0307037 A1 | 12/2008 | Zhang et al. | |
| 2009/0262668 A1* | 10/2009 | Hemar et al. | 370/260 |
| 2010/0094985 A1* | 4/2010 | Abu-Samaha et al. | 709/223 |
| 2010/0223668 A1 | 9/2010 | Koo et al. | |
| 2010/0262650 A1 | 10/2010 | Chauhan et al. | |

(Continued)

OTHER PUBLICATIONS

International Searching Authority, International Search Report and Written Opinion for International Application No. PCT/US2012/045283, mailed Sep. 17, 2012, 10 pages, United States Patent and Trademark Office, USA.

(Continued)

*Primary Examiner* — Jeffrey R Swearingen
(74) *Attorney, Agent, or Firm* — Kunzler Law Group

(57) ABSTRACT

Various methods for application costing to provide decision making for service provisioning are provided. One example method may comprise connecting to a web based portal environment system. The method may further comprise establishing a hypertext transfer protocol keep-alive connection with the web based portal environment system. The method may further comprise receiving a push command via the hypertext transfer protocol keep-alive connection. The method may additionally comprise executing the push command. Similar and related example methods, example apparatuses, and example computer program products are also provided.

21 Claims, 7 Drawing Sheets

(56) References Cited

U.S. PATENT DOCUMENTS

2013/0086228 A1* 4/2013 Goldman .................... 709/219

OTHER PUBLICATIONS

Ali Mesbah and Arie Van Deursen, "A Component- and Push-based Architectural Style for Ajax Applications", Delft University of Technology Software Engineering Research Group Technical Report Series, Journal of Systems and Software (JSS) Elsevier, 2008, 41 pages.
"Network Address Translation", Wikipedia, Jun. 27, 2011, 12 pages.

* cited by examiner

METHOD AND APPARATUS FOR A KEEP-ALIVE PUSH AGENT

CROSS-REFERENCE TO RELATED APPLICATIONS

This application claims priority under 35 USC 119 to U.S. Provisional Application No. 61/504,009 filed Jul. 1, 2011, which is incorporated by reference herein in its entirety.

TECHNICAL FIELD

Embodiments of the present invention relate generally to a push agent, and, more particularly, relate to a method, apparatus, and computer program product for providing a keep-alive push agent in a web based portal environment.

BACKGROUND

The computing industry, over time, has experienced a rapid growth and evolution. Not only have technological advancements led to new models of computing devices, but they have also led to developments in the systems and networks in which the computing devices operate and interact. Each new model of computing device, from mainframes and supercomputers to personal computers and mobile devices, has brought its own share of advantages as well as challenges.

Over the past several decades, computing has been transitioning from distributed systems (e.g. mainframes) to decentralized systems (e.g. personal computers). While the new decentralized, client-oriented personal computer model provided enhanced flexibility and convenience to users, it also resulted in inefficient usage of resources and unnecessary additional costs. For example, each personal computer required the processing power and storage capacity necessary for maximum, rather than typical, loads. As a result, the recent trend in computing has been to a centralized model where applications and data can be centrally managed, stored, and provisioned for the purpose of reducing costs and improving security and efficiency.

One emerging model, known as "the cloud," relies on the delivery of computing resources via a distributed computer network. In such a model, one or more "servers" in the cloud provide services to one or more distributed "clients." Services provided by the cloud may range from individual software applications to the full functionality of an operating system. Current cloud systems typically rely on input and requests from the client to guide a session. In keeping with the client-server paradigm, these requests are often made by a browser interface, which typically operates on a "pull" model whereby a cloud server provides information for display only in response to an explicit request from a client operating the browser. The request momentarily opens a connection with the server, which is typically closed shortly after the server serves the requested information. As a result, the cloud server providing the various services to the client may have a limited ability to independently direct the session.

Therefore, a need exists in the art for an agent in a centralized computing system that keeps alive a connection between the server and the client allowing the server to push information and commands to help control a session with the client.

SUMMARY

Methods, apparatuses, and computer program products are herein provided for providing a keep-alive push agent in a web based portal environment. Systems, methods, apparatuses, and computer program products in accordance with various embodiments may provide several advantages to computing devices, computing device users, and network providers. Various embodiments permit an administrator (e.g., a business enterprise or institution) to create a portal environment system for providing controlled and secure access to a private data center configured specifically for supplying services to a set of clients associated with the administrator (e.g., employees of the business enterprise or institution) on the client's personal device regardless of the client device or client's location.

Some example embodiments advantageously allow a server within a web based portal environment system to push messages and commands to users of the system over a hypertext transfer protocol (HTTP) keep-alive connection. In this way, a server may not be reliant on a user to request information or execute commands, but rather the server may dictate actions taken on the users' devices. Furthermore, various example embodiments may permit the server to send push commands to a user over a standard HTTP connection without requiring any specialized software on the user end aside from an Internet browser. In some instances, a push command may be used to provide messages, launch web pages, perform administrative actions (e.g., locking the desktop), launch applications and more within the portal environment system. Other embodiments provide the additional advantage of allowing the push commands to perform the same functionality external to the web based portal environment system on a user machine.

In an example embodiment, a method is provided, which may comprise connecting to a web based portal environment system. The method of this example embodiment may further comprise establishing a hypertext transfer protocol keep-alive connection with the web based portal environment system. The method of this example embodiment may further comprise receiving a push command via the hypertext transfer protocol keep-alive connection. The method may additionally comprise executing the push command.

In an example embodiment, a method is provided, which may comprise receiving an indication of a unique identifier associated with a hypertext transfer protocol keep-alive connection. The hypertext transfer protocol keep-alive connection may be between a broadcasting entity and a listening entity. The method of this example embodiment may further comprise generating a push command directed to the listening entity. The push command may comprise an indication of the unique identifier. The method of this example embodiment may further comprise providing for transmission of the push command from the broadcasting entity.

In an example embodiment, a method is provided, which may comprise generating a unique identifier associated with a hypertext transfer protocol keep-alive connection. The method of this example embodiment may further comprise providing for transmission of one or more reporting messages comprising the unique identifier. The push command may comprise an indication of the unique identifier. The method of this example embodiment may further comprise receiving a push command comprising an indication of the unique identifier. Additionally, the method of this example embodiment may comprise providing for transmission of the push command over the hypertext transfer protocol keep-alive connection.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
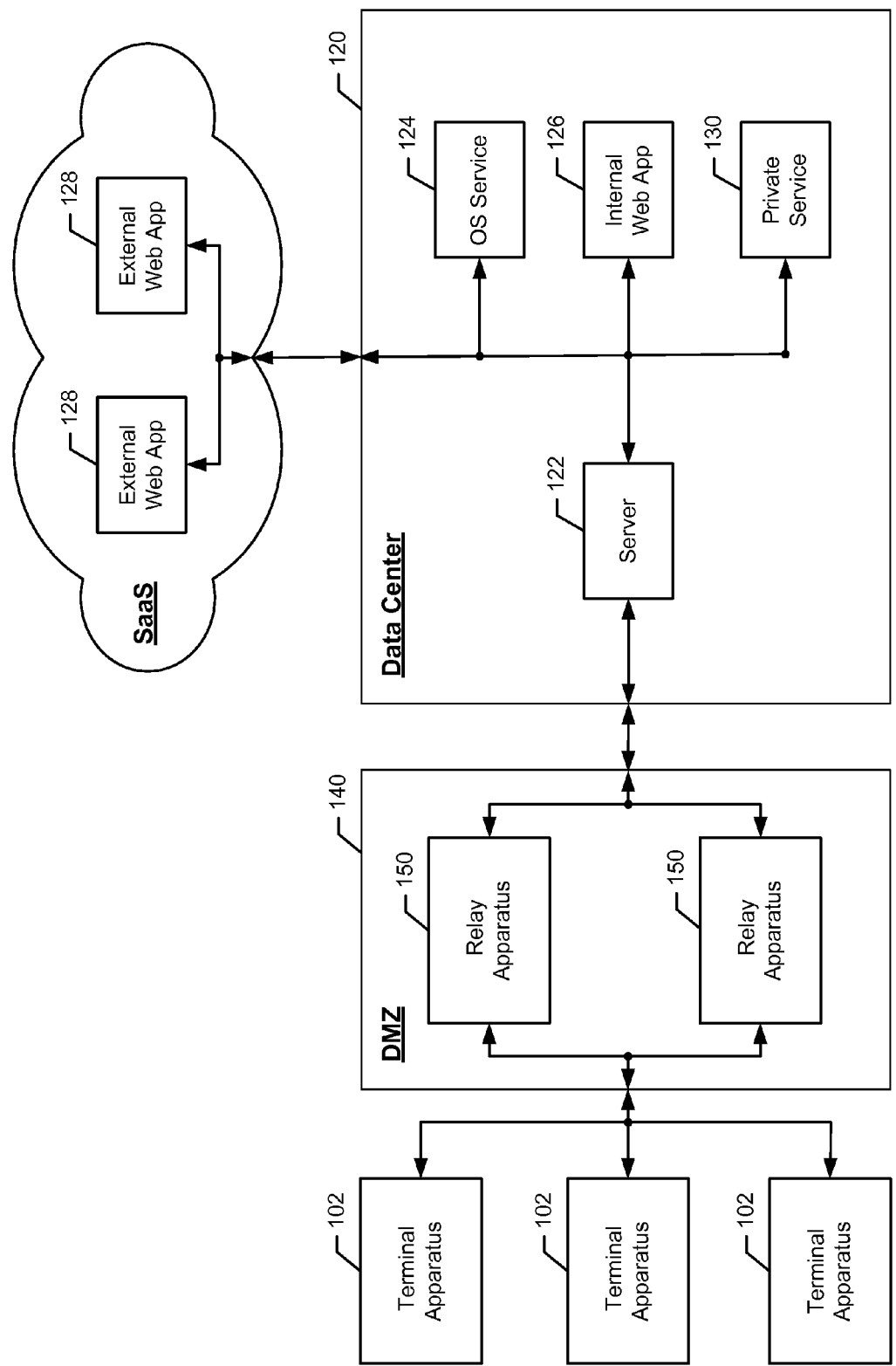
FIG. 1 illustrates a system for providing a keep-alive push agent according to some example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

Definitions

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a terminal apparatus, relay, or server, to perform various functions); and (c) circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, an integrated circuit in a terminal apparatus, relay, server, or other network device.

System

Referring now to FIG. 1, FIG. 1 illustrates a block diagram of a system 100 for providing a web based portal environment, for example via web-enabled delivery of a data center through a desktop built in a browser, according to an example embodiment. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing web-enabled delivery of a data center through a desktop built in a browser, numerous other configurations may also be used to implement embodiments of the present invention.

In example embodiments, the system 100 may comprise a data center 120. The data center 120 may be configured to operate as a private cloud, public cloud, or a combination private and public cloud. For example, a public cloud may provide services to any user, whereas a private cloud may provide services to a subset of all users (e.g., employees of a particular business enterprise providing the private cloud services). The data center 120 may, in some instances, be protected by a firewall. In some embodiments, the data center 120 may be located on an internal network such as a private local area network (LAN) or the like, or the data center 120 may be remotely located and/or hosted by a third party. In some instances, the data center 120 may comprise a combination of entities and services residing both locally and remotely.

According to some embodiments, the data center 120 may comprise one or more servers 122. A server 122 may be embodied as any computing device, or in some instances may be embodied as a virtual server. A server 122 may also be embodied as a combination of a plurality of computing devices. In this regard, the server 122 may be embodied, for example, as a server cluster and/or may be embodied as a distributed computing system, which may be distributed across a plurality of computing devices. In other embodiments, one or more servers 122 may be embodied on the same computing device.

According to various embodiments, the system 100 may comprise a demilitarized zone (DMZ) 140 located external to the data center 120. In this regard, the DMZ 140 may be located external to the firewall protecting the data center 120. In example embodiments, the DMZ 140 may comprise one or more relay apparatuses 150. A relay apparatus 150 may be embodied as any computing device, such as, for example, a server computer (e.g. a network web server), desktop computer, laptop computer, or the like. In other embodiments, a relay apparatus 150 may be embodied as a virtual relay. According to some embodiments, the relay apparatuses 150 in the DMZ 140 and the data center 120 may be embodied on the same computing device.

The system 100, according to example embodiments, may comprise one or more terminal apparatuses 102. In various embodiments, the one or more terminal apparatuses 102 may be located external to the DMZ 140 and the data center 120. In this regard, the one or more terminal apparatuses 102 may be located external to the firewall protecting the data center 120. A terminal apparatus 102 may be embodied as any computing device, such as, for example, a desktop computer, laptop computer, netbook, tablet, portable digital assistant (PDA), mobile terminal, mobile computer, mobile phone, mobile communication device, smart phone, game device, television device, digital video recorder, positioning device, any combination thereof, and/or the like.

In certain embodiments, a terminal apparatus 102 may be configured to establish a connection with at least one of the one or more relay apparatuses 150 in the DMZ 140. In some embodiments, a terminal apparatus 102 connected to a first relay apparatus 150 may be transferred to a second relay apparatus 150 during the same session. The connection may be established, for example, over the Internet via a transport protocol such as Transmission Control Protocol (TCP), User Datagram Protocol (UDP), or the like. In these embodiments, the connection may be established via an application-specific protocol such as Hypertext Transfer Protocol (HTTP), Hypertext Transfer Protocol Secure (HTTPS), or the like. The connection may be, in certain embodiments, a secure connection. For example, communication over the connection between the terminal apparatus 102 and the relay apparatus 150 may be secured using Transport Layer Security (TLS), Secure Sockets Layer (SSL), or the like. Data transmitted and received over the connection may be encrypted using, for example, 128 bit SSL encryption.

According to various embodiments, a relay apparatus 150 in the DMZ 140 may be configured to establish a connection with at least one of the one or more servers 122 in the data center 120. For example, a relay apparatus 150 may be configured to establish a pipeline connection with a server 122. The pipeline connection may be configured, in example embodiments, to provide bidirectional communication between the relay apparatus 150 and the server 122. For example, the pipeline connection may be a serial connection, Ethernet connection, socket connection, or the like. The pipeline connection may be, in some embodiments, made through one or more ports, for example through a single port in a firewall protecting the data center 120.

A relay apparatus 150, in example embodiments, may serve as an intermediary between one or more terminal apparatuses 102 and one or more servers 122. In this regard, the relay apparatus 150 may serve as a terminal end point for all communications and requests from the terminal apparatus 102 to the data center 120. The relay apparatus 150 may relay the communications and requests from the terminal apparatus 102 to the server 122. Similarly, the relay apparatus 150 may receive all communications to the terminal apparatus 102 originating from the data center 120 via the pipeline connection with the server 122 and relay the communications to the terminal apparatus 102 via the secure connection. In this regard, the server 122 may be configured to communicate with the applications, file systems, and databases inside the data center 120.

According to various embodiments, the combination of the relay apparatus 150 and the server 122 may provide a two-tier architecture for securing the data center 120 from external users, for example a user at a terminal apparatus 102. In this regard, the relay apparatus 150 may provide a first tier of security for the data center 120 while the server 122 may provide a second tier of security for the data center 120. In other embodiments, a terminal apparatus may be configured to connect directly to the server 122 thereby forming a single tier architecture.

According to various embodiments, the data center 120 may be configured to provide information and services to one or more terminal apparatuses 102 via the architecture described above. Examples of the information and services that may be provided by the data center 120, according to certain embodiments, are described in further detail below.

In some embodiments, the data center 120 may be configured to provide operating system specific services 124. For example, the data center 120 may provide Windows™ applications, such as Word™, Excel™, PowerPoint™, or the like. An operating system specific service 124, in certain embodiments, may be delivered by a publishing method. In this regard, the operating system specific service 124 may be remotely delivered from a terminal server (e.g. Microsoft® Terminal Server) running inside the data center 120. In other embodiments, an operating system specific service 124 may be delivered via an application virtualization method. In this regard, the operating system specific service 124 may be bundled in an executable file and deployed dynamically to a terminal apparatus 102 for local processing. In other embodiments, an operating system specific service 124 may refer to a service or application installed locally at the terminal apparatus and directed to be executed by the data center 120.

In example embodiments, the data center 120 may be configured to provide internally hosted web applications 126. In this regard, the internal web applications 126 may be natively integrated into the data center 120. For example, the internal web applications 126 may comprise web applications configured to run over HTTP, HTTPS, or another similar protocol, such as web servers (e.g. Apache, IIS), web portals (e.g. Microsoft SharePoint®, BEA Weblogic®, IBM Websphere®, Oracle PeopleSoft®, Oracle Financials®), content management systems, web consoles, and/or the like. In some embodiments, the internal web applications 126 may be developed in-house or may be developed by third party vendors.

According to various embodiments, the data center 120 may be configured to provide externally hosted web applications 128. The external web applications 128 may comprise, for example, Software as a Service (SaaS) applications. In certain embodiments, an external web application 128 may be hosted by a third party, for example at a remote data center. For example, the external web applications 128 may comprise applications offered by Salesforce.com™, Google Apps™, Microsoft Live™, Zoho™, Moodle™, and/or the like. An external web application 128 may be delivered to the data center 120 via a trusted connection, for example using Security Assertion Markup Language (SAML), delegated authentication, and/or the like. In this regard, the external web applications 128 may be integrated into the data center 120 for delivery to the terminal apparatuses 102 via the servers 122 and, in certain embodiments, relay apparatuses 150.

In some embodiments, the data center 120 may be configured to provide private services 130, such as cloud services. In this regard, the private services 128 may comprise file services, data services, or the like. The file services, in certain embodiments, may provide access to one or more network file systems, for example shared directories, home directories, public directories, and/or the like. The data services, in example embodiments, may provide access to one or more databases. The databases may in some instances be any Open Database Connectivity (ODBC) or Java Database Connectivity (JDBC) database, such as Microsoft SQL (Structured Query Language) Server®, MySQL™, Oracle Database®, IBM DB2®, Microsoft Access®, and/or the like. The databases may be accessible, for example, by web reporting, electronic web forms, and/or the like.

In example embodiments, the information and services of the data center 120 may be presented to a client or user of a terminal apparatus 102 via a web based portal environment, for example a desktop built in a browser. In this regard, the terminal apparatus 102 may be configured to provide a user with access to a web-enabled browser, for example Microsoft Internet Explorer®, Mozilla Firefox®, Google Chrome®, Opera®, Apple Safari®, and/or the like. In example embodiments, the user may be able to access a desktop using the browser of the terminal apparatus 102. In example embodiments, the desktop may be built on web technologies (e.g. Ajax, Comet, and/or the like) and generated natively at the browser in the terminal apparatus 102. In this regard, the desktop built in a browser may have features similar to a traditional desktop, such as menus, taskbars, desktop icons and background, custom settings, shortcuts, system tray, and/or the like. The desktop provided in the browser may be distinct from a traditional desktop provided by the operating system running on the terminal apparatus 102. Additionally, the desktop built in a browser may be distinct from a virtual presentation of a traditional desktop running at an external location, such as inside the data center 120. In some embodiments, the information and services of the data center 120 may be presented to a user of a terminal apparatus 102 via other portal interfaces, for example, a dashboard, mobile interface, tablet interface, or any other portal interface designed to provide access to one or more data center 120 and/or cloud services. Services and information may, in certain embodiments, be delivered directly to a user without the use of a portal interface.

The following provides an example embodiment of the present application. Therefore, it is to be understood that the inventions are not to be limited to this specific example embodiment and that modifications and other embodiments are intended to be included within the scope of the appended claims. In this example embodiment, a terminal apparatus 102 may transmit a handshake request to the relay apparatus 150. The relay apparatus 150 of this example embodiment may assign and store a unique identifier representing a session with the terminal apparatus 102, and the relay apparatus 150 may transmit the unique identifier to the terminal apparatus 102 and one or more servers 122 associated with the data center 120. In this example embodiment, the relay apparatus 150 may further open an HTTP keep-alive connection with the terminal apparatus 102 to which the terminal apparatus 102 may listen.

According to this example embodiment, a server 122 may push messages and/or commands to a terminal apparatus 102. In this regard, the server 122 may transmit the message and/or command to the relay apparatus 150 along with the unique identifier. The unique identifier may allow the server 122 to identify the particular keep-alive connection over which the message and/or command should be sent, and, therefore, to identify the terminal apparatus 102 to which the message and/or command should be sent. The relay apparatus 150 of this example embodiment may push the message and/or command over the keep-alive connection associated with the unique identifier. According to this example embodiment, the terminal apparatus 102 may receive the message and/or command from the relay apparatus 150. The terminal apparatus 102 may display the pushed message to a user and/or execute the pushed command.

In this regard, a keep-alive connection may typically remain open for an extended period of time without requiring the relay apparatus 150 to provide an immediate response (e.g., a response from the server 122) to the request for the keep-alive connection from the terminal apparatus 102. Such a keep-alive connection may be distinct from the connection created by a standard pull request, which typically requires an immediate response from the relay apparatus 150 (e.g., originating from the server 122) or else quickly times out. In this regard, a keep-alive connection may provide the relay apparatus 150 with an open connection over which the relay apparatus 150 may push messages and/or commands (e.g., from the server 122) to the terminal apparatus 102 without waiting on a specific pull request from the terminal apparatus 102 explicitly related to the message and/or command.

Additional embodiments of the present invention will now be described in greater detail with respect to the figures.

Terminal Apparatus

Figure 2:
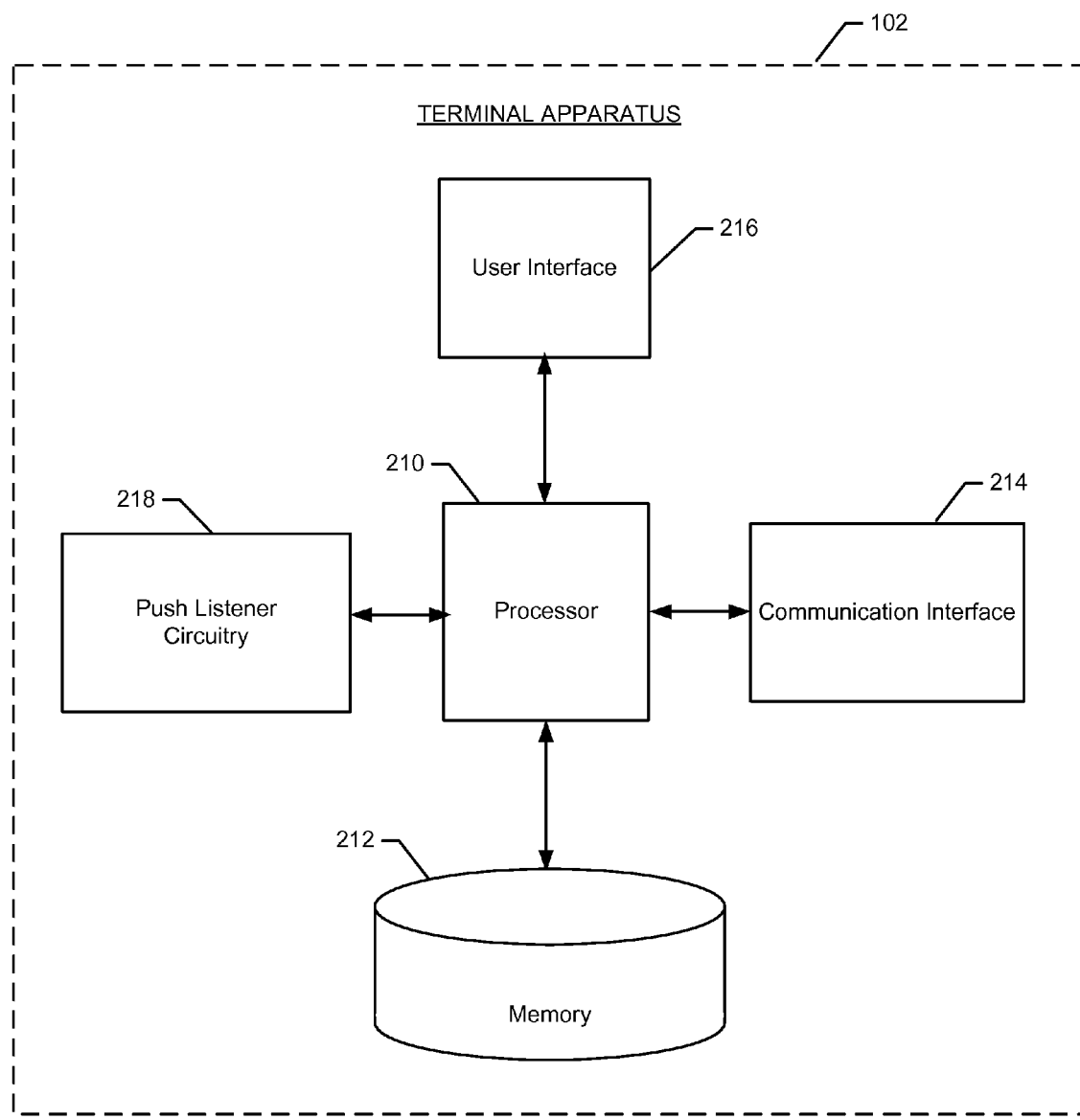
FIG. 2 illustrates a schematic block diagram of a terminal apparatus according to some example embodiments of the present invention.

Referring now to FIG. 2, FIG. 2 illustrates a block diagram of a terminal apparatus 102 according to an example embodiment. In the example embodiment, the terminal apparatus 102 comprises various components for performing the various functions herein described. These components may comprise one or more of a processor 210, memory 212, communication interface 214, user interface 216, or push listener circuitry 218. The components of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 212) that is executable by a suitably configured processing device (e.g., the processor 210), or some combination thereof.

In some example embodiments, one or more of the components illustrated in FIG. 2 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 210, memory 212, communication interface 214, user interface 216, and/or push listener circuitry 218 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute components for performing one or more operations for providing the functionalities described herein and/or for enabling user interface navigation with respect to the functionalities and/or services described herein.

The processor 210 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 2 as a single processor, in some embodiments the processor 210 comprises a plurality of processors. The plurality of processors may be in operative communication with each other and may be collectively configured to perform one or more functionalities of the terminal apparatus 102 as described herein. The plurality of processors may be embodied on a single client computing device or distributed across a plurality of client computing devices collectively configured to function as the terminal apparatus 102. In some example embodiments, the processor 210 may be configured to execute instructions stored in the memory 212 or otherwise accessible to the processor 210. These instructions, when executed by the processor 210, may cause the terminal apparatus 102 to perform one or more of the functionalities of the terminal apparatus 102 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an executor of instructions, such as may be stored in the memory 212, the instructions may specifically configure the processor 210 to perform one or more algorithms and operations described herein.

The memory 212 may comprise, for example, volatile memory, non-volatile memory, or some combination thereof. In this regard, the memory 212 may comprise one or more tangible and/or non-transitory computer-readable storage media that may comprise volatile and/or non-volatile memory. Although illustrated in FIG. 2 as a single memory, the memory 212 may comprise a plurality of memories. The plurality of memories may be embodied on a single computing device or may be distributed across a plurality of computing devices collectively configured to function as the terminal apparatus 102. In various example embodiments, the memory 212 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 212 may be configured to store information, data, applications, instructions, or the like for enabling the terminal apparatus 102 to carry out various functions in accordance with various example embodiments. For example, in some example embodiments, the memory 212 is configured to buffer input data for processing by the processor 210. Additionally or alternatively, the memory 212 may be configured to store program instructions for execution by the processor 210. The memory 212 may store information in the form of static and/or dynamic information. This stored information may be stored and/or used by the push listener circuitry 218 during the course of performing its functionalities.

The communication interface 214 may be embodied as any device or component embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. In an example embodiment, the communication interface 214 is at least partially embodied as or otherwise controlled by the processor 210. In this regard, the communication interface 214 may be in communication with the processor 210, such as via a bus. The communication interface 214 may comprise, for example, a network card (e.g. wired or wireless), an antenna, a transmitter, a receiver, and/or supporting hardware or software for enabling communications with one or more remote computing devices. The communication interface 214 may be configured to receive and/or transmit data using any protocol that may be used for communications between computing devices. In this regard, the communication interface 214 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 214 may be configured to enable communication between the terminal apparatus 102 and another device, such as a relay apparatus 150 or server 122. The communication interface 214 may additionally be in communication with the memory 212, user interface 216, and/or push listener circuitry 218, such as via a bus.

The user interface 216 may be in communication with the processor 210 to receive an indication of a user input and/or to provide an audible, visual, mechanical, or other output to a user. As such, the user interface 216 may comprise, for example, a keyboard, a mouse, a joystick, a display, a touch screen display, a microphone, a speaker, and/or other input/output mechanisms. In embodiments wherein the user interface 216 comprises a touch screen display, the user interface 216 may additionally be configured to detect and/or receive indication of a touch gesture or other input to the touch screen display. The user interface 216 may be in communication with the memory 212, communication interface 214, and/or push listener circuitry 218, such as via a bus.

The push listener circuitry 218 may be embodied as various components, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210. In embodiments wherein the push listener circuitry 218 is embodied separately from the processor 210, the push listener circuitry 218 may be in communication with the processor 210. The push listener circuitry 218 may further be in communication with one or more of the memory 212, communication interface 214, or user interface 216, such as via a bus.

According to various embodiments, the push listener circuitry 218 may be configured to receive a request from a user to log on to a portal environment system, such as a web based portal, to gain access to, for example, a data center. The portal interface may be, for example, a desktop in a browser, dashboard, mobile interface, tablet interface, or any other portal interface designed to provide access to one or more data center and/or cloud services. The push listener circuitry 218 may be configured to provide for transmission of a login request to a server 122 associated with the data center, in some instances via a relay apparatus 150. The login request may be, for example, in the form of an HTTP POST command.

In example embodiments, the push listener circuitry 218 may be configured to receive configuration information for the portal interface from the server 122, in some instances via a relay apparatus 150. The configuration information may indicate one or more services to make available to the user. In this regard, a service may refer to any service or application to which access is provided through the portal environment system, whether located on the terminal apparatus 102 associated with the push listener circuitry 218, in the data center, or on a remote entity. According to various embodiments, the push listener circuitry 218 may be configured to provide for display of the portal interface to the user. In this regard, the portal interface may comprise a representation of the one or more services indicated by the configuration information sent by the server 122.

According to example embodiments, the push listener circuitry 218 may be configured to provide for transmission of a handshake request to a relay apparatus 150. The handshake request may be transmitted by the push listener circuitry 218, in some embodiments, to begin the process of establishing an HTTP keep-alive connection. The push listener circuitry 218 may be configured to make the handshake request, for example, via an Asynchronous JavaScript and Extensible Markup Language (XML), or AJAX, request. The handshake request, in certain embodiments, may be transmitted to a Java™ servlet running on the relay apparatus 150.

In various embodiments, the push listener circuitry 218 may be configured to receive a response to the handshake request from the relay apparatus 150. The handshake response may comprise an indication of a unique identifier. In this regard, the unique identifier may represent the HTTP keep-alive connection that will be established between the terminal apparatus 102 associated with the push listener circuitry 218 and the relay apparatus 150. According to certain embodiments, the push listener circuitry 218 may be configured to provide for storage of the unique identifier.

According to some embodiments, the handshake response received by the push listener circuitry 218 may comprise a request to establish and/or information for establishing an HTTP keep-alive connection with the relay apparatus 150. In other embodiments, the push listener circuitry 218 may be configured to receive the request to establish and/or information for establishing an HTTP keep-alive connection from the relay apparatus 150 separately from (e.g., subsequent to) the handshake response.

The keep-alive connection information, in example embodiments, may comprise an indication of a temporary timeout value, or a duration of time for maintaining the keep-alive connection open prior to closing the connection and/or automatically reconnecting the connection. In other embodiments, the temporary timeout value may be negotiated between the terminal apparatus 102 and the relay apparatus 150, set by the terminal apparatus 102, configured by XML, or determined based on other factors. The HTTP keep-alive connection, for example, may be configured to remain open for a duration of two minutes prior to closing the connection and immediately reopening the connection for an additional two minutes, and so forth. In some instances, automatic closing and immediate reconnection of the HTTP keep-alive connection may continue throughout the duration of the session with the portal environment system. The push listener circuitry 218 may be configured to provide the unique identifier each time the connection is reopened in order to maintain the same unique identifier throughout the full lifetime (i.e., the various disconnections and reconnections) of the keep-alive connection.

In example embodiments, the HTTP keep-alive connection information may comprise a final timeout value, for example in XML format. The final timeout value may, in certain instances, indicate a duration after which the keep-alive connection will not be automatically reopened after closing. For example, the final timeout value may indicate that the keep-alive connection should not be automatically reconnected after being kept alive for one hour. In other embodiments, the final timeout value may be measured from the time of the last use of the keep-alive connection rather than the time of initiation of the keep-alive connection. In this way, the keep-alive connection will not be prevented from automatically reconnecting until the amount of time indicated by the final timeout value (e.g., one hour) has elapsed since the most recent use of the keep-alive connection.

According to various embodiments, the push listener circuitry 218 may be configured to listen to the HTTP keep-alive connection while it is open. For example, the push listener circuitry 218 may be configured to establish a listener to the HTTP keep-alive connection or, in some instances, to subscribe to the HTTP keep-alive connection. In this way, the push listener circuitry 218 may be immediately notified of or immediately receive any data or messages pushed over the HTTP keep-alive connection without requiring the use of pulling technology, such as HTTP polling.

In other embodiments, the HTTP keep-alive connection may be in the form of repeated long polling requests from the push listener circuitry 218 to the relay apparatus. For example, the long polling request may be a Comet programming request. According to example embodiments, rather than maintaining a live connection over which the relay apparatus 150 may push commands, the push listener circuitry 218 may be configured to emulate such a connection using repeated long polling requests. In this regard, the push listener circuitry 218 may be configured to transmit an initial long polling request to the relay apparatus 150. The push listener circuitry 218 may then receive a response to the long polling request and immediately provide for transmission of a new long polling request. In certain embodiments, the push listener circuitry 218 may be configured to transmit a new long polling request whether the previous response contains information or is empty. In this way, the push listener circuitry 218 may ensure that a long polling request is available at all times to which the relay apparatus 150 may respond with a push command or information.

As an example, the push listener circuitry 218 may provide for transmission of a generic Comet poll request to the relay apparatus 150. If the relay apparatus 150 does not currently have information to push to the terminal apparatus 102 associated with the push listener circuitry 218, the push listener circuitry 218 may not receive an immediate response to the long polling request. Instead, the push listener circuitry 218 may not receive a response until the relay apparatus 150 receives information to push to the push listener circuitry 218. In some instances, a given time frame, for example the temporary timeout value discussed above, may elapse before the relay apparatus 150 receives any information to push to the push listener circuitry 218. In these instances, the push listener circuitry 218 may be configured to receive a timeout message, such as an empty message, from the relay apparatus 150. In other cases, the push listener circuitry 218 may not receive any message and the long polling request may time out. In either case, the push listener circuitry 218 may be configured to immediately provide for transfer of a new long polling request to the relay apparatus 150.

According to various embodiments, the push listener circuitry 218 may be configured to receive a message over the HTTP keep-alive connection. For example, the push listener circuitry 218 may receive a push command from the relay apparatus 150. In some embodiments, the push command may comprise a message, a Uniform Resource Locator (URL), a link to a service in the data center, an action, and/or the like. A push command message may comprise an informational message, a warning message, an error message, an alert message, and/or the like. A push command URL may comprise an absolute or a relative URL and may refer to a global or local address. A push command link may comprise an indication of an operating system specific service 124, an internally hosted web application 126, an externally hosted web application 128, a private service 130, and/or the like. A push command action may comprise an action related to the portal environment system, the operating system of the terminal apparatus 102, and/or the like. Various examples of push command actions include: log a user out of the portal environment system, log a user out of the operating system, shut down the terminal apparatus 102, lock or unlock the screen of the terminal apparatus 102, lock or unlock the desktop of a desktop in a browser (i.e., in a portal environment system comprising a desktop in a browser), lock or unlock the desktop of the operating system, open or close a browser window within or external to the portal environment system, refresh a browser window within or external to the portal environment system, resize a browser window within or external to the portal environment system, close an application within the portal environment system (e.g., an application running via a terminal server), close an application external to the portal environment system (e.g., an application running locally), and/or the like.

In example embodiments, the push command may originate from a server 122 and be received by the push listener circuitry 218 via the relay apparatus 150. The push command may be in the form of a text string representing a serialized JavaScript™ Object Notation (JSON) object. According to some embodiments, the push listener circuitry 218 may be configured to convert the JSON string into a JavaScript™ object. The JavaScript™ object may comprise one or more attributes related to the push command.

According to various embodiments, the push listener circuitry 218 may be configured to interpret the push command and perform a related action in response. For example, the push listener circuitry 218 may be configured to call one or more JavaScript™ functions related to the action indicated in the push command. With respect to push command messages, the push listener circuitry 218 may be configured to provide for display of the message to a user, for example, via a dialog box. With respect to push command URLs, the push listener circuitry 218 may be configured to access the address specified in the URL, for example, in a new or existing web browser window. With respect to push command links, the push listener circuitry 218 may be configured to execute the link in order to launch the related service or application, for example a web application within a desktop in a browser. With respect to push command actions, the push listener circuitry 218 may be configured to perform the indicated action, for example, log the user out of the portal environment system.

In example embodiments, the push listener circuitry 218 may be configured to interpret the push command based at least in part on the one or more attributes. In certain instances, the one or more attributes may indicate the actual action to be taken. In other embodiments, the attributes may provide supplementary information necessary to perform the action. For example, a push command link may comprise a first attribute indicating that the push command relates to executing a link and a second attribute indicating the actual link to execute. Further examples of push command attributes include: the message type and/or message text to display for push command messages, the URL link for push command URLs, an indication of whether the push command should be executed within or external to a portal environment system, an indication of whether the push command should be executed within or external to the current window, and/or the like.

Server

Figure 3:
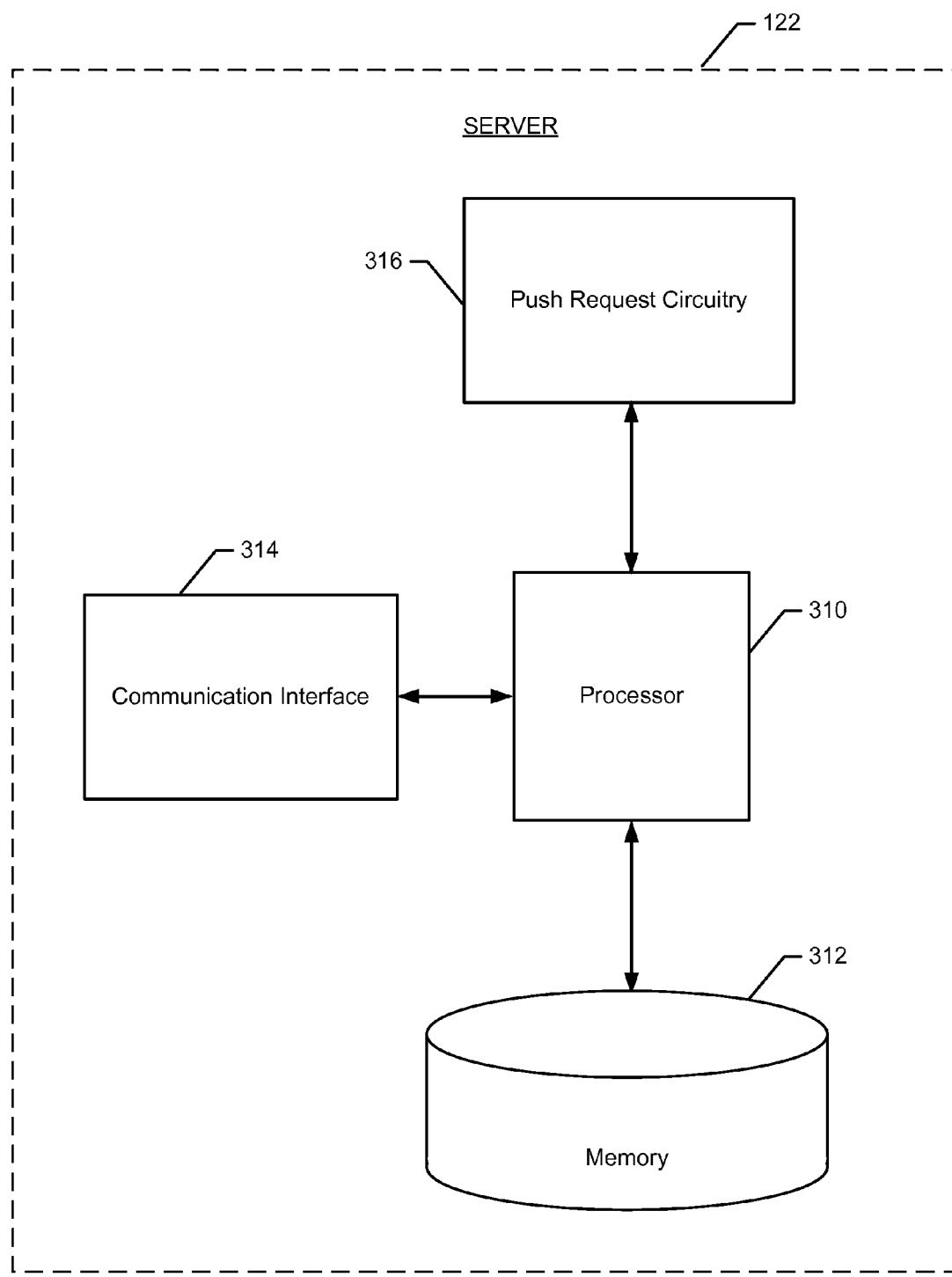
FIG. 3 illustrates a block diagram of a server according to some example embodiments of the present invention.

Referring now to FIG. 3, FIG. 3 illustrates a block diagram of a server 122 according to an example embodiment. In the example embodiment, the server 122 comprises various components for performing the various functions herein described. These components may comprise one or more of a processor 310, memory 312, communication interface 314, or push request circuitry 316. The components of the server 122 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 312) that is executable by a suitably configured processing device (e.g., the processor 310), or some combination thereof.

In some example embodiments, one or more of the components illustrated in FIG. 3 may be embodied as a chip or chip set. In other words, the server 122 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 310, memory 312, communication interface 314, and/or push request circuitry 316 may be embodied as a chip or chip set. The server 122 may therefore, in some example embodiments, be configured to implement embodiments of the present invention on a single chip or as a single "system on a chip." As another example, in some example embodiments, the server 122 may comprise component(s) configured to implement embodiments of the present invention on a single chip or as a single "system on a chip." As such, in some cases, a chip or chipset may constitute components for performing one or more operations for providing the functionalities described herein.

The processor 310 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 3 as a single processor, in some embodiments the processor 310 comprises a plurality of processors. The plurality of processors may be in operative communication with each other and may be collectively configured to perform one or more functionalities of the server 122 as described herein. The plurality of processors may be embodied on a single computing device or distributed across a plurality of computing devices collectively configured to function as the server 122. In some example embodiments, the processor 310 is configured to execute instructions stored in the memory 312 or otherwise accessible to the processor 310. These instructions, when executed by the processor 310, may cause the server 122 to perform one or more of the functionalities of the server 122 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an executor of instructions, such as may be stored in the memory 312, the instructions may specifically configure the processor 310 to perform one or more algorithms and operations described herein.

The memory 312 may comprise, for example, volatile memory, non-volatile memory, or some combination thereof. In this regard, the memory 312 may comprise one or more tangible and/or non-transitory computer-readable storage media that may comprise volatile and/or non-volatile memory. Although illustrated in FIG. 3 as a single memory, the memory 312 may comprise a plurality of memories. The plurality of memories may be embodied on a single computing device or may be distributed across a plurality of computing devices collectively configured to function as the server 122. In various example embodiments, the memory 312 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 312 may be configured to store information, data, applications, instructions, or the like for enabling the server 122 to carry out various functions in accordance with various example embodiments. For example, in some example embodiments, the memory 312 is configured to buffer input data for processing by the processor 310. Additionally or alternatively, the memory 312 may be configured to store program instructions for execution by the processor 310. The memory 312 may store information in the form of static and/or dynamic information. This stored information may be stored and/or used by the push request circuitry 316 during the course of performing its functionalities.

The communication interface 314 may be embodied as any device or component embodied in circuitry, hardware, a computer program product comprising computer readable program instructions stored on a computer readable medium (for example, the memory 312) and executed by a processing device (for example, the processor 310), or a combination thereof that is configured to receive and/or transmit data from/to another computing device. In an example embodiment, the communication interface 314 is at least partially embodied as or otherwise controlled by the processor 310. In this regard, the communication interface 314 may be in communication with the processor 310, such as via a bus. The communication interface 314 may comprise, for example, a network card (e.g. wired or wireless), an antenna, a transmitter, a receiver, and/or supporting hardware or software for enabling communications with one or more remote computing devices. The communication interface 314 may be configured to receive and/or transmit data using any protocol that may be used for communications between computing devices. In this regard, the communication interface 314 may be configured to receive and/or transmit data using any protocol that may be used for transmission of data over a wireless network, wireline network, some combination thereof, or the like by which the server 122 and one or more computing devices or computing resources may be in communication. As an example, the communication interface 314 may be configured to enable communication between the server 122 and another device, such as a relay apparatus 150 or terminal apparatus 102. The communication interface 314 may additionally be in communication with the memory 312 and/or push request circuitry 316, such as via a bus.

The push request circuitry 316 may be embodied as various components, such as circuitry, hardware, a computer program product comprising computer readable program instructions stored on a computer readable medium (for example, the memory 312) and executed by a processing device (for example, the processor 310), or some combination thereof and, in some embodiments, is embodied as or otherwise controlled by the processor 310. In embodiments wherein the push request circuitry 316 is embodied separately from the processor 310, the push request circuitry 316 may be in communication with the processor 310. The push request circuitry 316 may further be in communication with one or more of the memory 312 and/or communication interface 314, such as via a bus.

According to various embodiments, the push request circuitry 316 may be configured to receive a request from a terminal apparatus 102 for a user to log on to a web based portal provided by the server 122 associated with the push request circuitry 316. The push request circuitry 316 may provide for transmission of configuration information for the web based portal interface to the terminal apparatus 102. In some instances, the request from and response to the terminal apparatus 102 may occur via a relay apparatus 150. The configuration information may indicate one or more services to make available to the user. In this regard, a service may refer to any service or application to which access is provided through the portal environment system, whether located on the terminal apparatus 102, in the data center, or on a remote entity.

In some embodiments, the push request circuitry 316 may be configured to receive from a relay apparatus 150 an indication of the existence of an HTTP keep-alive connection between the relay apparatus 150 and a terminal apparatus 102. The indication may comprise a unique identifier representing the connection. The push request circuitry 316, according to example embodiments, may be configured to provide for storage of the unique identifier. The push request circuitry 316 may also be configured to store an indication of the terminal apparatus 102 and/or the relay apparatus 150 to which the unique identifier relates.

According to various embodiments, the push request circuitry 316 may be configured to push commands and/or messages to a terminal apparatus 102 via a relay apparatus 150. The push commands and/or messages may be similar to those described above with respect to the push listener circuitry 218. In some embodiments, the push request circuitry 316 may determine the relay apparatus 150 to which the push command should be sent based at least in part on the unique identifier. In this regard, the push request circuitry 316 may access the unique identifier of the HTTP keep-alive connection associated with the terminal apparatus 102 to which the push command is directed. In other embodiments, the push request circuitry 316 may be configured to provide for transmission of the push command to one or more relay apparatuses 150 along with the unique identifier. In these embodiments, the relay apparatuses 150 may determine whether the unique identifier relates to an HTTP keep-alive connection to which the particular relay apparatus 150 belongs.

In example embodiments, the push request circuitry 316 may be configured to generate the push command by making a call to an application programming interface (API) provided by a software development kit (SDK). In this regard, each push command may be represented on the server 122 associated with the push listener circuitry 218 by, for example, a Java™ object. The push listener circuitry 218 may be configured, in certain embodiments, to access the desired Java™ object and convert the Java™ object into a hash map. For example, the push listener circuitry 218 may be configured to utilize the Java™ HashMap object to convert the Java™ object into various key-value pairs that may be put into a HashMap object. The HashMap object may, in various embodiments, be converted into a text string representing a serialized JSON object. The push listener circuitry 218 may be configured to provide for transmission of the JSON string to the relay apparatus 150 for pushing to the terminal apparatus 102.

Relay Apparatus

Figure 4:
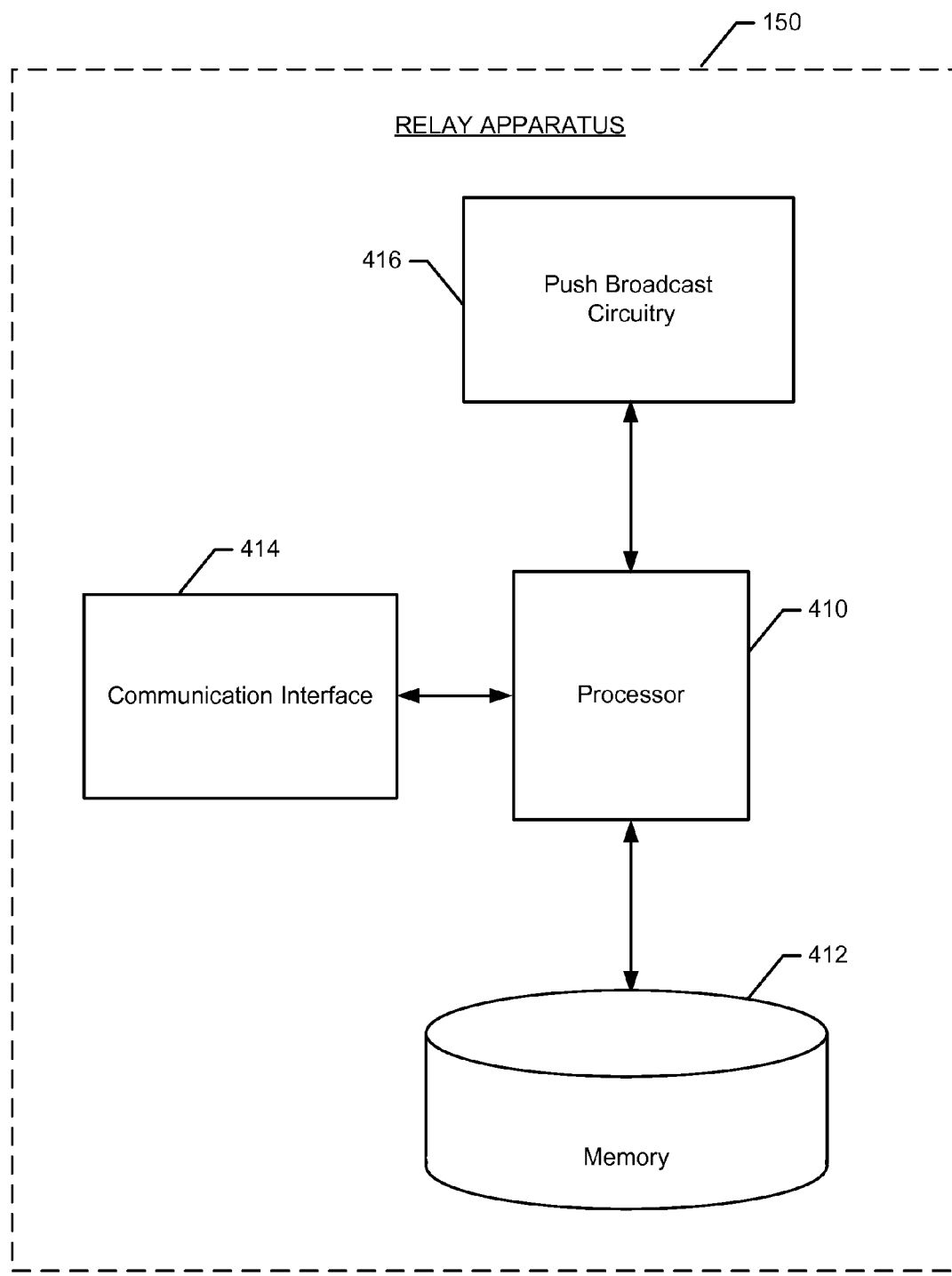
FIG. 4 illustrates a block diagram of a relay apparatus according to some example embodiments of the present invention.

Referring now to FIG. 4, FIG. 4 illustrates a block diagram of a relay apparatus 150 according to an example embodiment. In the example embodiment, the relay apparatus 150 comprises various components for performing the various functions herein described. These components may comprise one or more of a processor 410, memory 412, communication interface 414, or push broadcast circuitry 416. The components of the relay apparatus 150 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 412) that is executable by a suitably configured processing device (e.g., the processor 410), or some combination thereof.

In some example embodiments, one or more of the components illustrated in FIG. 4 may be embodied as a chip or chip set. In other words, the relay apparatus 150 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 410, memory 412, communication interface 414, and/or push broadcast circuitry 416 may be embodied as a chip or chip set. The relay apparatus 150 may therefore, in some example embodiments, be configured to implement embodiments of the present invention on a single chip or as a single "system on a chip." As another example, in some example embodiments, the relay apparatus 150 may comprise component(s) configured to implement embodiments of the present invention on a single chip or as a single "system on a chip." As such, in some cases, a chip or chipset may constitute components for performing one or more operations for providing the functionalities described herein.

The processor 410 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 4 as a single processor, in some embodiments the processor 410 comprises a plurality of processors. The plurality of processors may be in operative communication with each other and may be collectively configured to perform one or more functionalities of the relay apparatus 150 as described herein. The plurality of processors may be embodied on a single computing device or distributed across a plurality of computing devices collectively configured to function as the relay apparatus 150. In some example embodiments, the processor 410 is configured to execute instructions stored in the memory 412 or otherwise accessible to the processor 410. These instructions, when executed by the processor 410, may cause the relay apparatus 150 to perform one or more of the functionalities of the relay apparatus 150 as described herein. As such, whether configured by hardware or software methods, or by a combination thereof, the processor 410 may comprise an entity capable of performing operations according to embodiments of the present invention while configured accordingly. Thus, for example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. In this regard, the memory 412 may comprise one or more tangible and/or non-transitory computer-readable storage media that may comprise volatile and/or non-volatile memory. Although illustrated in FIG. 4 as a single memory, the memory 412 may comprise a plurality of memories. The plurality of memories may be embodied on a single computing device or may be distributed across a plurality of computing devices collectively configured to function as the relay apparatus 150. In various example embodiments, the memory 412 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 412 may be configured to store information, data, applications, instructions, or the like for enabling the relay apparatus 150 to carry out various functions in accordance with various example embodiments. For example, in some example embodiments, the memory 412 is configured to buffer input data for processing by the processor 410. Additionally or alternatively, the memory 412 may be configured to store program instructions for execution by the processor 410. The memory 412 may store information in the form of static and/or dynamic information. This stored information may be stored and/or used by the push broadcast circuitry 416 during the course of performing its functionalities.

The communication interface 414 may be embodied as any device or component embodied in circuitry, hardware, a computer program product comprising computer readable program instructions stored on a computer readable medium (for example, the memory 412) and executed by a processing device (for example, the processor 410), or a combination thereof that is configured to receive and/or transmit data from/to another computing device. In an example embodiment, the communication interface 414 is at least partially embodied as or otherwise controlled by the processor 410.

In this regard, the communication interface 414 may be in communication with the processor 410, such as via a bus. The communication interface 414 may comprise, for example, a network card (e.g. wired or wireless), an antenna, a transmitter, a receiver, and/or supporting hardware or software for enabling communications with one or more remote computing devices. The communication interface 414 may be configured to receive and/or transmit data using any protocol that may be used for communications between computing devices. In this regard, the communication interface 414 may be configured to receive and/or transmit data using any protocol that may be used for transmission of data over a wireless network, wireline network, some combination thereof, or the like by which the relay apparatus 150 and one or more computing devices or computing resources may be in communication. As an example, the communication interface 414 may be configured to enable communication between the relay apparatus 150 and another device, such as a terminal apparatus 102 or server 122. The communication interface 414 may additionally be in communication with the memory 412 and/or push broadcast circuitry 416, such as via a bus.

The push broadcast circuitry 416 may be embodied as various components, such as circuitry, hardware, a computer program product comprising computer readable program instructions stored on a computer readable medium (for example, the memory 412) and executed by a processing device (for example, the processor 410), or some combination thereof and, in some embodiments, is embodied as or otherwise controlled by the processor 410. In embodiments wherein the push broadcast circuitry 416 is embodied separately from the processor 410, the push broadcast circuitry 416 may be in communication with the processor 410. The push broadcast circuitry 416 may further be in communication with one or more of the memory 412 and/or communication interface 414, such as via a bus.

According to various embodiments, the push broadcast circuitry 416 may be configured to relay information between a first entity, for example a terminal apparatus 102, and a second entity, for example a server 122. In this regard, the push broadcast circuitry 416 may be configured to receive communications from a terminal apparatus 102 that are intended for a server 122. The push broadcast circuitry 416 may provide for transmission of the received communications to the server 122. Similarly, the push broadcast circuitry 416 may be configured to receive communications from the server 122 intended for the terminal apparatus 102 and to send the communications to the terminal apparatus 102.

In some embodiments, the push broadcast circuitry 416 may be configured to receive a handshake request from a terminal apparatus 102. The push broadcast circuitry 416 may be configured to receive the request via a Java™ servlet running on the relay apparatus 150 associated with the push broadcast circuitry 416. After receiving the handshake request, the push broadcast circuitry 416 may be configured to generate a unique identifier to represent a session between the relay apparatus 150 associated with the push broadcast circuitry 416 and the terminal apparatus 102. The push broadcast circuitry 416 may provide for transmission of a handshake response to the terminal apparatus 102. In example embodiments, the handshake response may comprise an indication of the unique identifier. The push broadcast circuitry 416 may be further configured to provide for transmission of the unique identifier to one or more servers 122 along with an indication of the relay apparatus 150 and terminal apparatus 102 to which the unique identifier relates.

According to example embodiments, the push broadcast circuitry 416 may further be configured to establish an HTTP keep-alive connection with the terminal apparatus 102. The HTTP keep-alive connection may be established and embodied according to the various embodiments described above with respect to the push listener circuitry 218. In example embodiments, the push broadcast circuitry 416 may be configured to receive one or more push commands and/or messages from a server 122. The push command may comprise an indication of the unique identifier corresponding to the keep-alive connection over which the push command should be sent.

In various embodiments, the push broadcast circuitry 416 may be configured to provide for transmission of the push command over the HTTP keep-alive connection indicated by the unique identifier received with the push command from the server 122. In this regard, the push broadcast circuitry 416 may be configured to perform a push over the connection when the connection is configured to operate as a push connection. In other embodiments, the push broadcast circuitry 416 may be configured to include the push command in a response to an existing long polling request from the terminal apparatus 102 when the keep-alive connection is configured to operate as a push connection emulator.

EXAMPLES

The following provides a non-limiting example of one embodiment and should not be construed to narrow the scope or spirit of the disclosure in any way. In this example, an employee logs in to her company's desktop-in-a-browser web based portal environment system. At login, the desktop-in-a-browser establishes a HTTP keep-alive connection with a relay, or server, in the portal environment system. The employee launches various services provided by the portal environment system via the desktop-in-a-browser. At some point, the desktop-in-a-browser receives a message pushed from the relay, or server, over the keep-alive connection and displays the message to the employee. The message alerts the employee that the portal environment system will log out all users in five minutes to perform routine system tests. The desktop-in-a-browser, upon receiving the message from the relay, or server, immediately reestablishes the keep-alive connection. Approximately five minutes later, the desktop-in-a-browser receives a command to log out the user pushed from the relay, or server, over the keep-alive connection. The desktop-in-a-browser then executes the command and logs the employee out of the system.

Figure 5:
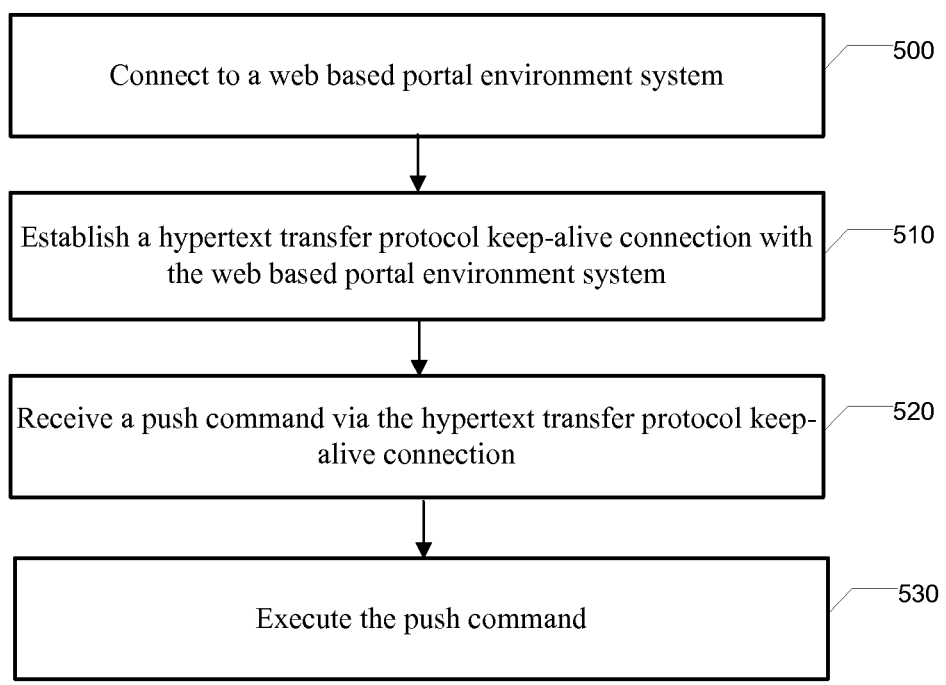
FIG. 5 illustrates a flowchart according to an example method for providing a keep-alive push agent according to some example embodiments of the present invention.

FIG. 5 illustrates a flowchart according to an example method for providing a keep-alive push agent in a web based portal environment according to an example embodiment. In this regard, FIG. 5 illustrates operations that may be performed at a terminal apparatus 102. The operations illustrated in and described with respect to FIG. 5 may, for example, be performed by, with the assistance of, and/or under the control of the processor 210, memory 212, communication interface 214, user interface 216, or push listener circuitry 218. Operation 500 may comprise connecting to a web based portal environment system. The processor 210, memory 212, communication interface 214, user interface 216, or push listener circuitry 218 may, for example, provide structure for performing operation 500. Operation 510 may comprise establishing a hypertext transfer protocol keep-alive connection with the web based portal environment system. The processor 210, memory 212, communication interface 214, user interface 216, or push listener circuitry

218 may, for example, provide structure for performing operation 510. Operation 520 may comprise receiving a push command via the hypertext transfer protocol keep-alive connection. The processor 210, memory 212, communication interface 214, user interface 216, or push listener circuitry 218 may, for example, provide structure for performing operation 520. Operation 530 may comprise executing the push command. The processor 210, memory 212, communication interface 214, user interface 216, or push listener circuitry 218 may, for example, provide structure for performing operation 530.

Figure 6:
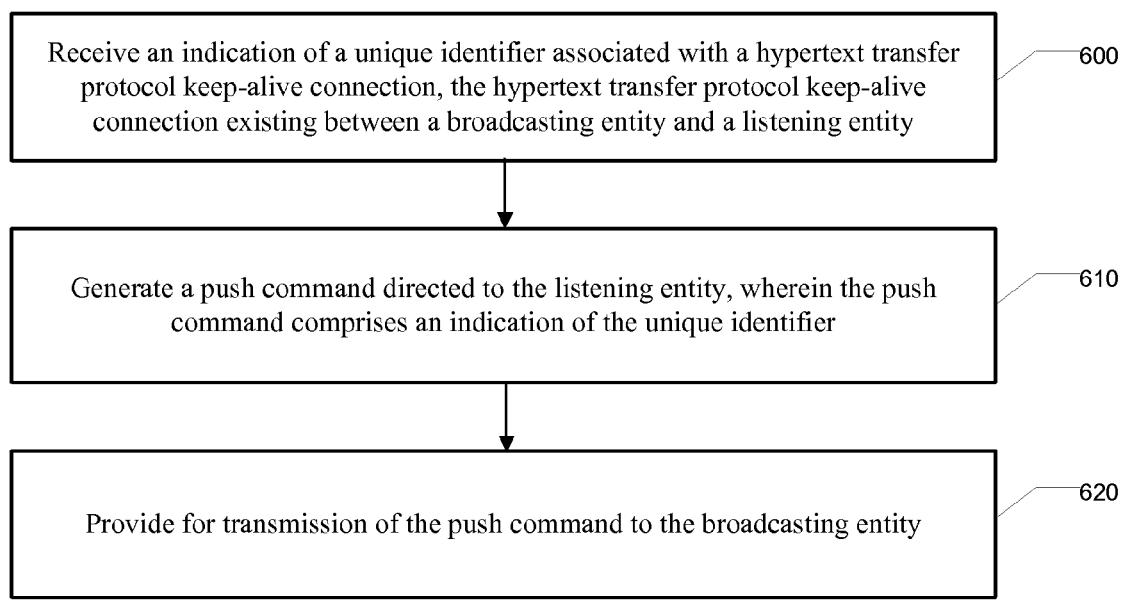
FIG. 6 illustrates a flowchart according to an example method for providing a keep-alive push agent according to some example embodiments of the present invention.

FIG. 6 illustrates a flowchart according to another example method for providing a keep-alive push agent in a web based portal environment according to an example embodiment. In this regard, FIG. 6 illustrates operations that may be performed at a server 122. The operations illustrated in and described with respect to FIG. 6 may, for example, be performed by, with the assistance of, and/or under the control of one or more of the processor 310, memory 312, communication interface 314, or push request circuitry 316. Operation 600 may comprise receiving an indication of a unique identifier associated with a hypertext transfer protocol keep-alive connection. The hypertext transfer protocol keep-alive connection may be between a broadcasting entity and a listening entity. The processor 310, memory 312, communication interface 314, or push request circuitry 316 may, for example, provide structure for performing operation 600. Operation 610 may comprise generating a push command directed to the listening entity. The push command may comprise an indication of the unique identifier. The processor 310, memory 312, communication interface 314, or push request circuitry 316 may, for example, provide structure for performing operation 610. Operation 620 may comprise providing for transmission of the push command to the broadcasting entity. The processor 310, memory 312, communication interface 314, or push request circuitry 316 may, for example, provide structure for performing operation 620.

Figure 7:
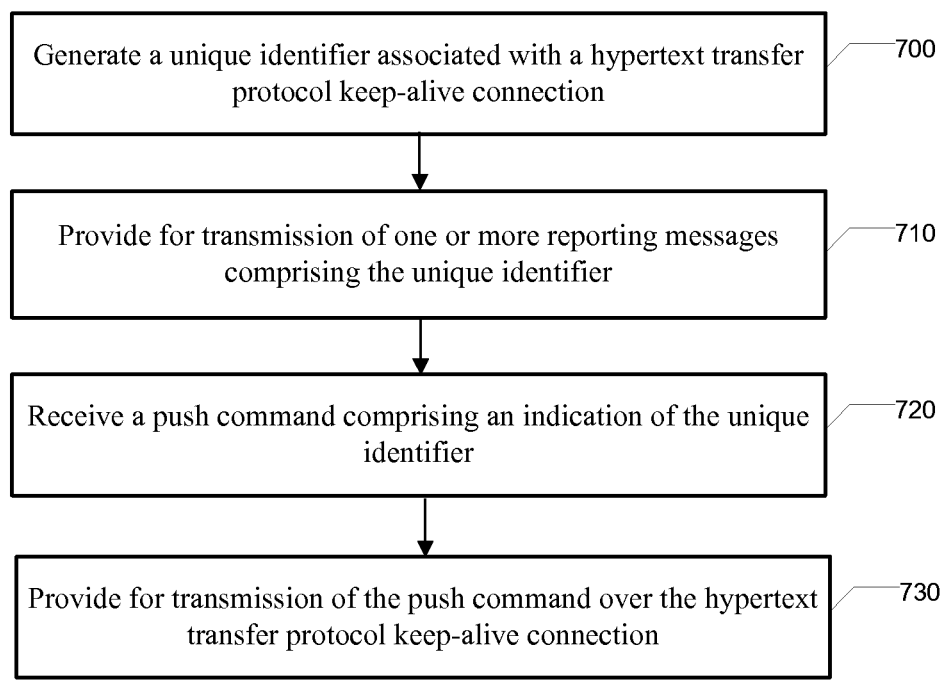
FIG. 7 illustrates a flowchart according to an example method for providing a keep-alive push agent according to some example embodiments of the present invention.

FIG. 7 illustrates a flowchart according to another example method for providing a keep-alive push agent in a web based portal environment according to an example embodiment. In this regard, FIG. 7 illustrates operations that may be performed at a relay apparatus 150. The operations illustrated in and described with respect to FIG. 7 may, for example, be performed by, with the assistance of, and/or under the control of one or more of the processor 410, memory 412, communication interface 414, or push broadcast circuitry 416. Operation 700 may comprise generating a unique identifier associated with a hypertext transfer protocol keep-alive connection. Each entry may comprise one or more requirements associated with the entry. The processor 410, memory 412, communication interface 414, or push broadcast circuitry 416 may, for example, provide structure for performing operation 700. Operation 710 may comprise providing for transmission of one or more reporting messages comprising the unique identifier. The processor 410, memory 412, communication interface 414, or push broadcast circuitry 416 may, for example, provide structure for performing operation 710. Operation 720 may comprise receiving a push command comprising an indication of the unique identifier. The processor 410, memory 412, communication interface 414, or push broadcast circuitry 416 may, for example, provide structure for performing operation 720. Operation 730 may comprise providing for transmission of the push command over the hypertext transfer protocol keep-alive connection. The processor 410, memory 412, communication interface 414, or push broadcast circuitry 416 may, for example, provide structure for performing operation 730.

FIGS. 5-7 each illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212, memory 312, or memory 412) of a terminal apparatus, server, relay apparatus, or other computing device (e.g., the terminal apparatus 102) and executed by a processor (e.g., the processor 210, processor 310, or processor 410) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In one embodiment, a suitably configured processor (for example, the processor 210, processor 310, and/or processor 410) may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium (for example, the memory 212, memory 312, and/or memory 412), and computer-readable program code portions, such as a series of computer instructions, embodied in the computer-readable storage medium.

In an example embodiment, a method is provided, which may comprise connecting to a web based portal environment system. The method of this example embodiment may further comprise establishing a hypertext transfer protocol keep-alive connection with the web based portal environment system. The method of this example embodiment may further comprise receiving a push command via the hypertext transfer protocol keep-alive connection. The method may additionally comprise executing the push command.

The example method may further comprise providing for transmission of a handshake request for indicating an intent to establish the hypertext transfer protocol keep-alive connection. Additionally, the example method may comprise receiving a handshake response. The handshake response may comprise an indication of a unique identifier. The method of this example embodiment may further comprise associating the unique identifier with the hypertext transfer protocol keep-alive connection. Establishing the hypertext transfer protocol keep-alive connection of the example embodiment may further comprise providing for transmission of a plurality of long polling requests in succession. Additionally, receiving the push command of the example embodiment may further comprise receiving a push command in response to one of the plurality of long polling requests. The push command may comprise one or more attributes related to the push command.

In another example embodiment, an apparatus comprising at least one processor and at least one memory storing computer program code is provided. The at least one memory and stored computer program code may be configured, with the at least one processor, to cause the apparatus of this example embodiment to at least connect to a web based portal environment system. The at least one memory and stored computer program code may be configured, with the at least one processor, to further cause the apparatus of this example embodiment to establish a hypertext transfer protocol keep-alive connection with the web based portal environment system. The at least one memory and stored computer program code may be configured, with the at least one processor, to additionally cause the apparatus of this example embodiment to receive a push command via the hypertext transfer protocol keep-alive connection. The at least one memory and stored computer program code may be configured, with the at least one processor, to further cause the apparatus of this example embodiment to execute the push command.

The at least one memory and stored computer program code may be configured, with the at least one processor, to further cause the apparatus of this example embodiment to provide for transmission of a handshake request for indicating an intent to establish the hypertext transfer protocol keep-alive connection. Additionally, the at least one memory and stored computer program code may be configured, with the at least one processor, to cause the apparatus of this example embodiment to receive a handshake response. The handshake response may comprise an indication of a unique identifier. The at least one memory and stored computer program code may be configured, with the at least one processor, to further cause the apparatus of this example embodiment to associate the unique identifier with the hypertext transfer protocol keep-alive connection. Establishing the hypertext transfer protocol keep-alive connection of the example embodiment may further comprise providing for transmission of a plurality of long polling requests in succession. Additionally, receiving the push command of the example embodiment may further comprise receiving a push command in response to one of the plurality of long polling requests. The push command may comprise one or more attributes related to the push command.

In another example embodiment, a computer program product is provided. The computer program product of this example embodiment may include at least one computer-readable storage medium having computer-readable program instructions stored therein. The program instructions of this example embodiment may comprise program instructions configured to connect to a web based portal environment system. The program instructions of this example embodiment may further comprise program instructions configured to establish a hypertext transfer protocol keep-alive connection with the web based portal environment system. The program instructions of this example embodiment may additionally comprise program instructions configured to receive a push command via the hypertext transfer protocol keep-alive connection. The program instructions of this example embodiment may further comprise program instructions configured to execute the push command.

The program instructions of this example embodiment may further comprise program instructions configured to provide for transmission of a handshake request for indicating an intent to establish the hypertext transfer protocol keep-alive connection. Additionally, the program instructions of this example embodiment may comprise program instructions configured to receive a handshake response. The handshake response may comprise an indication of a unique identifier. The program instructions of this example embodiment may further comprise program instructions configured to associate the unique identifier with the hypertext transfer protocol keep-alive connection. Establishing the hypertext transfer protocol keep-alive connection of the example embodiment may further comprise providing for transmission of a plurality of long polling requests in succession. Additionally, receiving the push command of the example embodiment may further comprise receiving a push command in response to one of the plurality of long polling requests. The push command may comprise one or more attributes related to the push command.

In another example embodiment, an apparatus is provided, which may comprise means for connecting to a web based portal environment system. The apparatus of this example embodiment may further comprise means for establishing a hypertext transfer protocol keep-alive connection with the web based portal environment system. The apparatus of this example embodiment may additionally comprise means for receiving a push command via the hypertext transfer protocol keep-alive connection. The apparatus of this example embodiment may additionally comprise means for executing the push command.

The apparatus of this example embodiment may additionally comprise providing for transmission of a handshake request for indicating an intent to establish the hypertext transfer protocol keep-alive connection. Additionally, the apparatus of this example embodiment may comprise receiving a handshake response. The handshake response may comprise an indication of a unique identifier. The apparatus of this example embodiment may further comprise associating the unique identifier with the hypertext transfer protocol keep-alive connection. Establishing the hypertext transfer protocol keep-alive connection of the example embodiment may further comprise providing for transmission of a plurality of long polling requests in succession. Additionally, receiving the push command of the example embodiment may further comprise receiving a push command in response to one of the plurality of long polling requests. The push command may comprise one or more attributes related to the push command.

In an example embodiment, a method is provided, which may comprise receiving an indication of a unique identifier associated with a hypertext transfer protocol keep-alive connection. The hypertext transfer protocol keep-alive connection may be between a broadcasting entity and a listening entity. The method of this example embodiment may further comprise generating a push command directed to the listening entity. The push command may comprise an indication of the unique identifier. The method of this example embodiment may further comprise providing for transmission of the push command to the broadcasting entity.

In another example embodiment, an apparatus comprising at least one processor and at least one memory storing computer program code is provided. The at least one memory and stored computer program code may be configured, with the at least one processor, to cause the apparatus of this example embodiment to at least receive an indication of a unique identifier associated with a hypertext transfer protocol keep-alive connection. The hypertext transfer protocol keep-alive connection may be between a broadcasting entity and a listening entity. The at least one memory and stored computer program code may be configured, with the at least one processor, to further cause the apparatus of this example embodiment to generate a push command directed to the listening entity. The push command may comprise an indication of the unique identifier. The at least one memory and stored computer program code may be configured, with the at least one processor, to additionally cause the apparatus of this example embodiment to provide for transmission of the push command to the broadcasting entity.

In another example embodiment, a computer program product is provided. The computer program product of this example embodiment may include at least one computer-readable storage medium having computer-readable program instructions stored therein. The program instructions of this example embodiment may comprise program instructions configured to receive an indication of a unique identifier associated with a hypertext transfer protocol keep-alive connection. The hypertext transfer protocol keep-alive connection may be between a broadcasting entity and a listening entity. The program instructions of this example embodiment may further comprise program instructions configured to generate a push command directed to the listening entity. The push command may comprise an indication of the unique identifier. The program instructions of this example embodiment may additionally comprise program instructions configured to provide for transmission of the push command to the broadcasting entity.

In another example embodiment, an apparatus is provided, which may comprise means for receiving an indication of a unique identifier associated with a hypertext transfer protocol keep-alive connection. The hypertext transfer protocol keep-alive connection may be between a broadcasting entity and a listening entity. The apparatus of this example embodiment may further comprise means for generating a push command directed to the listening entity. The push command may comprise an indication of the unique identifier. The apparatus of this example embodiment may additionally comprise means for providing for transmission of the push command to the broadcasting entity.

In an example embodiment, a method is provided, which may comprise generating a unique identifier associated with a hypertext transfer protocol keep-alive connection. The method of this example embodiment may further comprise providing for transmission of one or more reporting messages comprising the unique identifier. The push command may comprise an indication of the unique identifier. The method of this example embodiment may further comprise receiving a push command comprising an indication of the unique identifier. Additionally, the method of this example embodiment may comprise providing for transmission of the push command over the hypertext transfer protocol keep-alive connection.

In another example embodiment, an apparatus comprising at least one processor and at least one memory storing computer program code is provided. The at least one memory and stored computer program code may be configured, with the at least one processor, to cause the apparatus of this example embodiment to at least generate a unique identifier associated with a hypertext transfer protocol keep-alive connection. The at least one memory and stored computer program code may be configured, with the at least one processor, to further cause the apparatus of this example embodiment to provide for transmission of one or more reporting messages comprising the unique identifier. The push command may comprise an indication of the unique identifier. The at least one memory and stored computer program code may be configured, with the at least one processor, to additionally cause the apparatus of this example embodiment to receive a push command comprising an indication of the unique identifier. The at least one memory and stored computer program code may be configured, with the at least one processor, to further cause the apparatus of this example embodiment to provide for transmission of the push command over the hypertext transfer protocol keep-alive connection.

In another example embodiment, a computer program product is provided. The computer program product of this example embodiment may include at least one computer-readable storage medium having computer-readable program instructions stored therein. The program instructions of this example embodiment may comprise program instructions configured to generate a unique identifier associated with a hypertext transfer protocol keep-alive connection. The program instructions of this example embodiment may further comprise program instructions configured to provide for transmission of one or more reporting messages comprising the unique identifier. The push command may comprise an indication of the unique identifier. The program instructions of this example embodiment may additionally comprise program instructions configured to receive a push command comprising an indication of the unique identifier. The program instructions of this example embodiment may further comprise program instructions configured to provide for transmission of the push command over the hypertext transfer protocol keep-alive connection.

In another example embodiment, an apparatus is provided, which may comprise means for generating a unique identifier associated with a hypertext transfer protocol keep-alive connection. The apparatus of this example embodiment may further comprise means for providing for transmission of one or more reporting messages comprising the unique identifier. The apparatus of this example embodiment may additionally comprise means for receiving a push command comprising an indication of the unique identifier. Additionally, the apparatus of this example embodiment may comprise means for providing for transmission of the push command over the hypertext transfer protocol keep-alive connection.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed is:

1. A method for communicating with a web based portal environment system, the method comprising:
   accessing a server via a broadcasting entity, wherein the server, the listening entity, and the broadcasting entity are separate from one another,
   transmitting, by a listening entity, a handshake request to the broadcasting entity,
   establishing a hypertext transfer protocol keep-alive connection with the web based portal environment system in response to the handshake request, wherein the hypertext transfer protocol keep-alive connection is established between the broadcasting entity and the listening entity and automatically reopens after closing,
   receiving, at the listening entity, a unique identifier for the hypertext transfer protocol keep-alive connection,
   providing, by the listening entity, the unique identifier each time the hypertext transfer protocol keep-alive connection is reopened,
   receiving, at the listening entity, a temporary timeout value and a final timeout value, the temporary timeout value indicating a duration of time for maintaining the keep-alive connection prior to closing and automatically reopening the keep-alive connection, the final timeout value indicating a period of time from an initiation of the keep-alive connection after which the keep-alive connection, upon being closed, will not automatically reopen,
   receiving, at the listening entity, a push command from the server via the hypertext transfer protocol keep-alive connection, and
   executing, at the listening entity, the push command.

2. The method of claim 1, wherein the step of establishing a hypertext transfer protocol keep-alive connection further comprises transmitting a plurality of long polling requests in succession.

3. The method of claim 2, wherein the step of receiving the push command via the hypertext transfer protocol keep-alive connection further comprises receiving a push command in response to one of the plurality of long polling requests.

4. The method of claim 1, wherein the handshake request indicates an intent to establish the hypertext transfer protocol keep-alive connection.

5. The method of claim 4 further comprising receiving a handshake response.

6. The method of claim 5 wherein receiving the handshake response further comprises associating the unique identifier with the hypertext transfer protocol keep-alive connection.

7. The method of claim 1, wherein the step of executing the push command comprises executing one or more of the actions of:
   log a user out of the web based portal environment system;
   lock a user out of the web based portal environment system;
   open or close a browser window within or external to the portal environment system;
   refresh a browser window within or external to the portal environment system;
   resize a browser window within or external to the portal environment system;
   close an application within the portal environment system, and close an application external to the portal environment system.

8. The method of claim 1, wherein the listening entity is located external to a firewall protecting the server, wherein the broadcasting entity relays communications between the listening entity and the server through the firewall.

9. An apparatus for communicating with a web based portal environment system, the apparatus comprising:
   at least one processor;
   at least one memory storing computer program code; and
   wherein the at least one memory and the at least one stored computer program code are configured, with the at least one processor, to cause the apparatus to,
   connect to a server within a web based portal environment system via a broadcasting entity,
   transmit, at a listening entity, a handshake request to the broadcasting entity,
   establish a hypertext transfer protocol keep-alive connection with the web based portal environment system in response to the handshake request, wherein the hypertext transfer protocol keep-alive connection is established between the broadcasting entity and the listening entity and automatically reopens after closing, wherein the server, the listening entity, and the broadcasting entity are separate from one another,
   receive, at the listening entity, a unique identifier for the hypertext transfer protocol keep-alive connection,
   provide, by the listening entity, the unique identifier each time the hypertext transfer protocol keep-alive connection is reopened,
   receive, at the listening entity, a temporary timeout value and a final timeout value, the temporary timeout value indicating a duration of time for maintaining the keep-alive connection prior to closing and automatically reopening the keep-alive connection, the final timeout value indicating a period of time from an initiation of the keep-alive connection after which the keep-alive connection, upon being closed, will not automatically reopen, receive, at the listening entity, a push command from the server via the hypertext transfer protocol keep-alive connection, and execute, at the listening entity, the push command.

10. The apparatus of claim 9, wherein the at least one memory and at least one stored computer program code are configured, with the at least one processor, to cause the apparatus to establish the hypertext transfer protocol keep-alive connection by providing for transmission of a plurality of long polling requests in succession.

11. The apparatus of claim 10, wherein the at least one memory and at least one stored computer program code are configured, with the at least one processor, to cause the apparatus to receive the push command as a response to one of the plurality of long polling requests.

12. The apparatus of claim 9, wherein the handshake request indicates an intent to establish the hypertext transfer protocol keep-alive connection.

13. The apparatus of claim 12, wherein the at least one memory and at least one stored computer program code are configured, with the at least one processor, to cause the apparatus to receive a handshake response.

14. The apparatus of claim 13, wherein the handshake response includes the unique identifier, wherein the at least one memory and at least one stored computer program code are configured, with the at least one processor, to cause the apparatus to associate the unique identifier with the hypertext transfer protocol keep-alive connection.

15. A computer program product for a keep-alive push agent, the computer program product comprising:
 at least one computer-readable storage medium having computer-readable program instructions stored therein; and
 wherein the program instructions comprise program instructions are configured to,
  connect to a server within a web based portal environment system via a broadcasting entity,
  transmit, at a listening entity, a handshake request to the broadcasting entity,
  establish a hypertext transfer protocol keep-alive connection with the web based portal environment system, wherein the hypertext transfer protocol keep-alive connection is established between the broadcasting entity and the listening entity, wherein the server, the listening entity, and the broadcasting entity are separate from one another,
  receive, at the listening entity, a unique identifier for the hypertext transfer protocol keep-alive connection,
  automatically re-open the hypertext transfer protocol keep-alive connection after closing, wherein the listening entity provides the unique identifier each time the hypertext transfer protocol keep-alive connection is reopened,
  receive, at the listening entity, a temporary timeout value and a final timeout value, the temporary timeout value indicating a duration of time for maintaining the keep-alive connection prior to closing and automatically reopening the keep-alive connection, the final timeout value indicating a period of time from an initiation of the keep-alive connection after which the keep-alive connection, upon being closed, will not automatically reopen,
  receive, at the listening entity, a push command from the server via the hypertext transfer protocol keep-alive connection, and
  execute, at the listening entity, the push command.

16. The computer program product of claim 15, wherein the program instructions are configured to provide for transmission of a plurality of long polling requests in succession.

17. The computer program product of claim 16, wherein the program instructions are configured to receiving a push command in response to one of the plurality of long polling requests.

18. The computer program product of claim 17, wherein the push command comprises one or more attributes related to the push command.

19. The computer program product of claim 15 wherein the handshake request indicates an intent to establish the hypertext transfer protocol keep-alive connection.

20. The computer program product of claim 19 wherein the program instructions comprise program instructions configured to receive a handshake response.

21. The computer program product of claim 20 wherein the handshake response includes the unique identifier, wherein the program instructions are configured to associate the unique identifier with the hypertext transfer protocol keep-alive connection.

* * * * *